US011947729B2

United States Patent
Wu

(10) Patent No.: US 11,947,729 B2
(45) Date of Patent: Apr. 2, 2024

(54) GESTURE RECOGNITION METHOD AND DEVICE, GESTURE CONTROL METHOD AND DEVICE AND VIRTUAL REALITY APPARATUS

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD. (CN)

( * ) Notice: Subject to any disclaimer, the term of this patent is extended or adjusted under 35 U.S.C. 154(b) by 0 days.

(21) Appl. No.: 17/885,224

(22) Filed: Aug. 10, 2022

(65) Prior Publication Data

US 2022/0382386 A1 Dec. 1, 2022

Related U.S. Application Data

(63) Continuation of application No. PCT/CN2021/118286, filed on Sep. 14, 2021.

(51) Int. Cl.
*G06F 3/01* (2006.01)
*G06F 3/0482* (2013.01)
(Continued)

(52) U.S. Cl.
CPC .............. *G06F 3/017* (2013.01); *G06V 10/44* (2022.01); *G06V 10/761* (2022.01); *G06V 20/46* (2022.01); *G06V 40/10* (2022.01); *G06V 40/28* (2022.01)

(58) Field of Classification Search
CPC ...... G06F 3/017; G06V 10/44; G06V 10/761; G06V 20/46; G06V 40/10; G06V 40/28; G06V 40/113; G06N 3/08
See application file for complete search history.

(56) References Cited

U.S. PATENT DOCUMENTS

| 8,854,433 B1* | 10/2014 | Rafii | G06F 3/011 |
| | | | 348/42 |
| 8,872,899 B2* | 10/2014 | Givon | G06F 3/017 |
| | | | 382/154 |

(Continued)

FOREIGN PATENT DOCUMENTS

| CN | 103827891 A | 5/2014 |
| CN | 104424470 A | 3/2015 |

(Continued)

OTHER PUBLICATIONS

Learning to Estimate 3D Hand Pose From a Single RGB Image, Jul. 10, 2018, available at httpsblog.csdn.netbaidu_38262850 articledetails80991282, with English translation (20 pages).

(Continued)

*Primary Examiner* — Jordany Nunez

(57) ABSTRACT

The disclosure provides a gesture recognition method and device, a gesture control method and device and a virtual reality apparatus, the gesture recognition method includes: obtaining a hand image, acquired by each lens of a binocular camera, of a user; recognizing, through a pre-constructed recognition model, a first group of hand bone points from the obtained hand image, to obtain a hand bone point image in which the first group of recognized hand bone points is marked on a hand region of the hand image; obtaining, according to the obtained hand bone point image, two-dimensional positional relations and three-dimensional positional relations between various bone points in a second group of hand bone points as hand gesture data of the user; and recognizing a gesture of the user according to the hand gesture data.

20 Claims, 5 Drawing Sheets

(51) Int. Cl.
  *G06V 10/44* (2022.01)
  *G06V 10/74* (2022.01)
  *G06V 20/40* (2022.01)
  *G06V 40/10* (2022.01)
  *G06V 40/20* (2022.01)

(56) References Cited

U.S. PATENT DOCUMENTS

| | | | | |
|---|---|---|---|---|
| 8,897,491 | B2* | 11/2014 | Ambrus | G06T 11/20 |
| | | | | 382/103 |
| 9,372,546 | B2* | 6/2016 | Yin | G06T 7/174 |
| 9,600,078 | B2* | 3/2017 | Rafii | G06T 15/20 |
| 10,078,796 | B2* | 9/2018 | Lim | G06V 40/113 |
| 2011/0129124 | A1* | 6/2011 | Givon | G06T 7/75 |
| | | | | 345/158 |
| 2012/0309532 | A1* | 12/2012 | Ambrus | G06T 11/20 |
| | | | | 463/36 |
| 2014/0055352 | A1* | 2/2014 | Davis | A61B 5/0261 |
| | | | | 345/156 |
| 2014/0232631 | A1* | 8/2014 | Fleischmann | G06F 18/28 |
| | | | | 345/156 |
| 2016/0124513 | A1* | 5/2016 | Dal Zot | G06F 3/0304 |
| | | | | 715/863 |
| 2016/0132125 | A1* | 5/2016 | Charng | G06F 3/0304 |
| | | | | 345/156 |
| 2016/0206206 | A1* | 7/2016 | Avila | A61B 5/4504 |
| 2017/0068849 | A1* | 3/2017 | Lim | G06V 10/762 |
| 2017/0115796 | A1 | 4/2017 | Jiang | |
| 2017/0161903 | A1* | 6/2017 | Yerli | G06V 40/28 |
| 2018/0032142 | A1* | 2/2018 | Oshima | G06F 3/0482 |
| 2019/0034714 | A1 | 1/2019 | Barth et al. | |
| 2020/0050841 | A1 | 2/2020 | Hsieh et al. | |
| 2020/0097091 | A1 | 3/2020 | Chou et al. | |
| 2020/0393911 | A1* | 12/2020 | Zhao | G06T 13/40 |
| 2021/0026455 | A1* | 1/2021 | Dash | G06V 10/34 |
| 2021/0232232 | A1* | 7/2021 | Wang | G06T 7/11 |
| 2021/0259774 | A1* | 8/2021 | Fouts | G06N 3/08 |
| 2021/0279893 | A1* | 9/2021 | Iwanowski | G06T 7/248 |
| 2022/0366717 | A1* | 11/2022 | Wu | G06F 3/0325 |

FOREIGN PATENT DOCUMENTS

| | | |
|---|---|---|
| CN | 105892877 A | 8/2016 |
| CN | 107292295 A | 10/2017 |
| CN | 108346168 A | 7/2018 |
| CN | 108604299 A | 9/2018 |
| CN | 109214282 A | 1/2019 |
| CN | 109325995 A | 2/2019 |
| CN | 110147767 A | 8/2019 |
| CN | 110555412 A | 12/2019 |
| CN | 110826382 A | 2/2020 |
| CN | 111694428 A | 9/2020 |
| CN | 112083800 A | 12/2020 |
| CN | 112115799 A | 12/2020 |
| CN | 112198962 A | 1/2021 |
| CN | 112527113 A | 3/2021 |
| CN | 112926423 A | 6/2021 |
| CN | 113238650 A | 8/2021 |
| IN | 110796033 A | 2/2020 |

OTHER PUBLICATIONS

International Search Report dated Jan. 17, 2022 in International Patent Application No. PCT/CN2021/118286, with English translation (8 pages).

Written Opinion of the International Search Authority dated Jan. 17, 2022 in International Patent Application No. PCT/CN2021/118286, with English translation (6 pages).

First Office Action dated Jun. 30, 2022 in Chinese Patent Application No. 202110405475.9, with English translation (18 pages).

* cited by examiner

GESTURE RECOGNITION METHOD AND DEVICE, GESTURE CONTROL METHOD AND DEVICE AND VIRTUAL REALITY APPARATUS

CROSS-REFERENCE TO RELATED APPLICATION

The disclosure is a continuation of PCT international application No. PCT/CN2021/118286, filed on Sep. 14, 2021, which claims the priority of Chinese Patent Application No. 202110405475.9, filed to the Chinese Patent Office on Apr. 15, 2021 and entitled "GESTURE RECOGNITION METHOD AND DEVICE, GESTURE CONTROL METHOD AND DEVICE AND VIRTUAL REALITY APPARATUS", the entire contents of the PCT international application and the Chinese patent application are incorporated herein by reference.

TECHNICAL FIELD

The disclosure relates to the technical field of virtual reality apparatuses, and in particular to a gesture recognition method and device, a gesture control method and device and a virtual reality apparatus.

BACKGROUND

A virtual reality head-mounted integrated machine apparatus can be used to provide the user with the virtual reality experience by presenting the virtual image. In general, such an apparatus is a head mount display (HMD). The virtual image can be one or more virtual shapes, objects or other visual phenomena, the presentation mode of which makes them seem to exist in the virtual world. Various virtual contents are presented to the user through the display screen of the virtual reality head-mounted integrated machine apparatus. The real shapes, objects or visual phenomena are fused in the virtual scene, so as to perfectly fuse virtuality with reality.

The virtual control is of great significance in the virtual scene interaction. For example, in some virtual scenes, the virtual control can randomly adjust some functions including the display brightness, the volume, the visual attributes, etc.

Currently, in the virtual reality system, the handle controls the tracker so as to control the virtual control. Such an interaction mode is not natural enough. Particularly in some special scenes, it is impossible to use the handle to control the tracker for the control and interaction of the virtual control, or in some scenes, it is complicated to use the handle to control the tracker, and thus the poor immersive experience of using the virtual reality apparatus is brought to the user.

Therefore, the inventors consider that it is the time to solve at least one technical problem in the related art.

SUMMARY

One objective of the description is to provide a novel technical solution to gesture recognition and control for a virtual reality apparatus.

In the first aspect of an embodiment of the present disclosure, provided is a gesture recognition method for a virtual reality apparatus. The virtual reality apparatus includes a binocular camera. The gesture recognition method includes: obtaining a hand image, acquired by each lens of the binocular camera, of a user; recognizing, through a pre-constructed recognition model, a first group of hand bone points from the obtained hand image, to obtain a hand bone point image in which the first group of recognized hand bone points is marked on a hand region of the hand image, where the first group of hand bone points includes finger joint bone points and a palm center bone point; obtaining, according to the obtained hand bone point image, two-dimensional positional relations and three-dimensional positional relations between various bone points in a second group of hand bone points as hand gesture data of the user, where the first group of hand bone points includes the second group of hand bone points; and recognizing, according to the hand gesture data, a gesture of the user.

In an embodiment, the second group of hand bone points includes a thumb fingertip bone point and an index fingertip bone point. The obtaining, according to the obtained hand bone point image, two-dimensional positional relations and three-dimensional positional relations between various bone points in a second group of hand bone points includes: obtaining, according to two-dimensional coordinates of the thumb fingertip bone point and the index fingertip bone point in the obtained hand bone point image, three-dimensional coordinates of the thumb fingertip bone point and the index fingertip bone point; obtaining, according to the three-dimensional coordinates, a three-dimensional Euclidean distance between the thumb fingertip bone point and the index fingertip bone point, and determining, according to the three-dimensional Euclidean distance, a three-dimensional positional relation between the thumb fingertip bone point and the index fingertip bone point; and obtaining, according to a contour between the thumb fingertip bone point and the index fingertip bone point in the obtained hand bone point image and the two-dimensional coordinates, a two-dimensional Euclidean distance between the thumb fingertip bone point and the index fingertip bone point and a distance of the contour, and determining, according to the two-dimensional Euclidean distance and the distance of the contour, a two-dimensional positional relation between the thumb fingertip bone point and the index fingertip bone point.

In an embodiment, the recognizing, according to the hand gesture data, a gesture of the user includes: determining a gesture recognition result of the user as pinching of a thumb and an index finger when the two-dimensional positional relation is that the distance of the contour is greater than the two-dimensional Euclidean distance, and the three-dimensional positional relation is that the three-dimensional Euclidean distance is smaller than a set threshold value.

In an embodiment, the obtaining a hand image, acquired by each lens of the binocular camera, of a user includes: obtaining a plurality of frames of hand images acquired by each lens at a plurality of set time points respectively. The obtaining, according to the obtained hand bone point image, two-dimensional positional relations and three-dimensional positional relations between various bone points in a second group of hand bone points includes: obtaining, according to the hand bone point image obtained at the same time point, two-dimensional positional relations and three-dimensional positional relations, corresponding to the time point, between various bone points in the second group of hand bone points. The recognizing, according to the hand gesture data, a gesture of the user includes: determining a gesture recognition result, at the time point, of the user as pinching of the thumb and the index finger when the two-dimensional positional relation corresponding to the time point is that a distance of the contour is greater than the two-dimensional Euclidean distance, and the three-dimensional positional relation corresponding to the time point is that the three-dimensional Euclidean distance is smaller than the set threshold value; traversing the time point; and determining that the gesture recognition result of the user is pinching of the thumb and the index finger when gesture recognition results, at all time points, of the user are all pinching of the thumb and the index finger after traversing.

In an embodiment, the first group of hand bone points includes the twenty finger joint bone points and the one palm center bone point, each finger being provided with four of the finger joint bone points, of which one is arranged on a fingertip, and the other three are respectively arranged on three joints of a corresponding finger.

In an embodiment, the recognition models include a hand detection model and a hand bone point marking model, the hand detection model being used for recognizing the hand region from the hand image, and the hand bone point marking model being used for recognizing and marking the first group of hand bone points in the hand region.

The step of constructing the recognition model includes: constructing, through a hand gesture image library and a hand region label library corresponding to the hand gesture image library, a first training sample set; constructing, through the hand region label library corresponding to the hand gesture image library and a hand bone point label library corresponding to the hand region label library, a second training sample set; training, through the first training sample set, model parameters of a first basic model corresponding to the hand detection model, to obtain the hand detection model; training, through the second training sample set, model parameters of a second basic model corresponding to the hand bone point marking model, to obtain the hand bone point marking model; and sequentially connecting the hand detection model with the hand bone point marking model, to obtain the recognition model.

In the second aspect of an embodiment of the present disclosure, provided is a gesture control method for a virtual reality apparatus. The gesture control method includes: obtaining a gesture recognition result of a user, the gesture recognition result being obtained based on any one of the gesture recognition methods described above; and performing, according to the gesture recognition result, gesture control on power on and off and parameter adjustment of a virtual control of the virtual reality apparatus.

In the third aspect of an embodiment of the present disclosure, provided is a gesture recognition device for a virtual reality apparatus. The virtual reality apparatus includes a binocular camera. The gesture recognition device includes:

an image acquisition module configured for obtaining a hand image, acquired by each lens of the binocular camera, of a user; a hand bone point recognition module configured for recognizing, through a pre-constructed recognition model, a first group of hand bone points from the obtained hand image, to obtain a hand bone point image in which the first group of recognized hand bone points is marked on a hand region of the hand image, where the first group of hand bone points includes finger joint bone points and a palm center bone point; a hand gesture data creation module configured for obtaining, according to the obtained hand bone point image, two-dimensional positional relations and three-dimensional positional relations between various bone points in a second group of hand bone points, and taking the two-dimensional positional relations and the three-dimensional positional relations as hand gesture data of the user, where the first group of hand bone points includes the second group of hand bone points; and a gesture recognition module configured for recognizing, according to the hand gesture data, a gesture of the user.

In the fourth aspect of an embodiment of the present disclosure, provided is a gesture control device for a virtual reality apparatus. The gesture control device includes: a gesture recognition device, the gesture recognition device being the gesture recognition device described above; and a control module configured for performing, according to a gesture recognition result provided by the gesture recognition device, gesture control on power on and off and parameter adjustment of a virtual control of the virtual reality apparatus.

In the fifth aspect of an embodiment of the present disclosure, provided is a virtual reality apparatus, including a processor and a memory, the memory being used for storing an instruction, and the instruction being used for controlling the processor to execute any one of the methods described above.

One beneficial effect of the embodiments of the disclosure lies in that in the embodiment, according to the obtained hand bone point image, the two-dimensional positional relations and the three-dimensional positional relations between various bone points in the second group of hand bone points are obtained as the hand gesture data of the user, so as to recognize the gesture of the user by integrating characteristics of the hand gesture data in two dimensions, thereby greatly improving accuracy of recognizing the gesture of the user.

Another beneficial effect of the embodiments of the disclosure lies in that in the embodiment, the gesture recognition result obtained through any one of the gesture recognition methods described above is obtained, the power on and off and the parameter adjustment of the virtual control of the virtual reality apparatus are subjected to the gesture control according to the gesture recognition result, and thus an interaction mode between the user and the virtual reality apparatus is more natural and simpler, thereby improving user's immersive experience of using the virtual reality apparatus.

With reference to the detailed descriptions in combination with the accompanying drawings below on the exemplary embodiments in the disclosure, other features and advantages thereof in the disclosure will become clear.

BRIEF DESCRIPTION OF THE DRAWINGS

The accompanying drawings, which are incorporated into and constitute a part of the description, illustrate the embodiments of the disclosure and, together with the description thereof, are used to explain the principles of the disclosure.

BRIEF DESCRIPTION OF THE EMBODIMENTS

Various exemplary embodiments in the description will now be described in detail with reference to the accompanying drawings. It should be noted that the relative arrangements, numerical expressions, and values of the components and steps set forth in these embodiments do not limit the scope of the description unless specifically stated otherwise.

The following description of at least one exemplary embodiment is merely illustrative in nature and is in no way intended to limit the description, and its application or use.

The techniques, methods, and apparatuses known to those of ordinary skill in the relevant art may not be discussed in detail, but should be considered part of the description where appropriate.

In all examples shown and discussed herein, any particular value should be interpreted as illustrative only and not as limiting. Thus, other examples of the exemplary embodiments may have different values.

It should be noted that like numerals and letters denote like items in the following accompanying drawings, and therefore, once an item is defined in one accompanying drawing, it need not be further discussed in the subsequent accompanying drawings.

All the embodiments and examples of the disclosure are described below with reference to the accompanying drawings.

Method Embodiment 1

Figure 1:
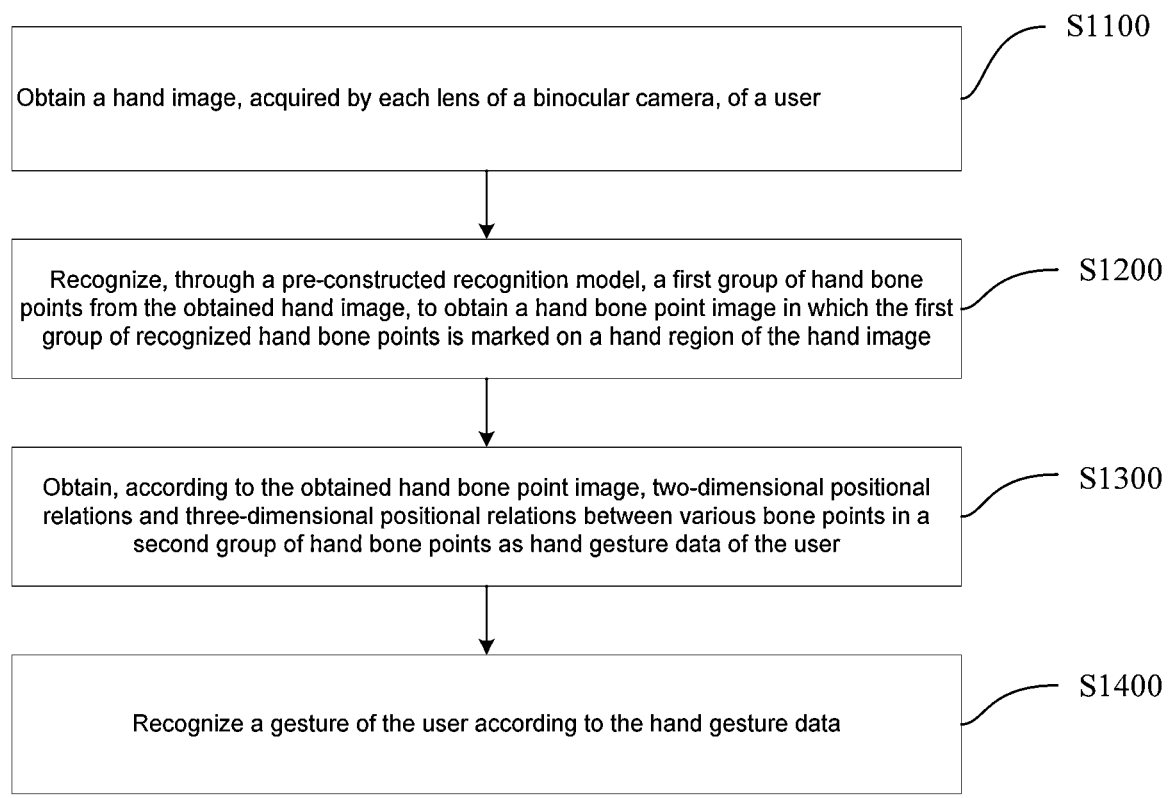
FIG. 1 shows a schematic flow chart of a gesture recognition method for a virtual reality apparatus according to an embodiment of the disclosure.

FIG. 1 shows a schematic flow chart of a gesture recognition method for a virtual reality apparatus according to an embodiment of the disclosure.

As shown in FIG. 1, the gesture recognition method includes the following steps:

At S1100, obtain a hand image, acquired by each lens of a binocular camera, of a user.

Particularly, the binocular camera simulates structural design of human eyes and is used for photographing two hand images of the user from left and right in the same scene. Based on the two images obtained from left and right, third-dimensional depth information of pixel points of a two-dimensional image may be obtained through a stereo matching algorithm, and then based on the two obtained images, hand gesture data of the user may be constructed in a two dimension and a three dimension, thereby improving accuracy of recognizing a hand gesture of the user.

In an embodiment of the disclosure, the binocular camera includes two fish-eye lenses, parameters of which are:

①  field of view (FOV): 143°*107°*163° (H*V*D), that is, the fish-eye lens has a field of view in a horizontal direction of 143°, a field of view in a vertical direction of 107°, and a field of view in a diagonal direction of 163°;

② resolution: 640*480;

③ frame rate: 30 Hz;

④ shutter mode: global shutter; and

⑤ color channel: monochrome.

Particularly, the binocular camera has the two lenses, and at the same time point, the two lenses acquire each one frame of hand images of the user from left and right respectively, so as to obtain two frames of hand images of the user.

In an embodiment of the disclosure, two frames of hand images, acquired by the binocular camera at one time point, of the user may be obtained.

In another embodiment of the disclosure, a plurality of frames of hand images, acquired by the binocular camera at a plurality of set time points respectively, of the user may be obtained. The plurality of set time points may be N (N>1) continuous time points, where N is an empirical threshold value and cannot be set too large, otherwise, a gesture recognition time will be affected, and use experience of the user is affected accordingly. For example, N may be 5, that is, a plurality of frames of hand images, acquired by the binocular camera at five continuous time points respectively, of the user are obtained.

At S1200, recognize, through a pre-constructed recognition model, a first group of hand bone points from the obtained hand image, to obtain a hand bone point image in which the first group of recognized hand bone points is marked on a hand region of the hand image, where the first group of hand bone points includes finger joint bone points and a palm center bone point.

Particularly, owing to a close positional relation between a hand gesture and the hand joint points, whether the hand joint points can be rapidly and accurately recognized before gesture recognition will directly determine the accuracy of recognizing the gesture.

In an embodiment of the disclosure, twenty one hand joint points most closely related to the hand gesture are selected as a first group of hand bone points to be recognized. The first group of hand bone points includes twenty finger joint bone joints and one palm center bone joint, the twenty finger joint bone points being positioned on five fingers, each finger being provided with four finger joint bone joints, of which one is arranged on a fingertip, and the other three are respectively arranged on three joints, and one palm center bone joint being positioned at a palm center. By recognizing twenty one bone points from the hand image, apart from determination of various hand gestures, accuracy of recognizing each bone point is improved by constraining positional relations between the twenty one hand bone points, thereby improving the accuracy of recognizing the gesture.

Particularly, the recognition models include a hand detection model and a hand bone point marking model, the hand detection model being used for recognizing the hand region from the hand image, and the hand bone point marking model being used for recognizing and marking the first group of hand bone points in the hand region.

In an embodiment of the disclosure, the step of constructing the recognition model includes:

At S1211, construct, through a hand gesture image library and a hand region label library corresponding to the hand gesture image library, a first training sample set.

In an embodiment of the disclosure, the binocular camera is used to acquire 150 hand act behavior cases of the user, to obtain 2 million hand gesture images, and based on the obtained 2 million hand gesture images, the hand gesture image library is constructed, where the hand gesture image is a hand image of the user.

Further, a hand region of the image in the hand gesture image library is marked, to obtain the hand region label library corresponding to the hand gesture image library, and based on the hand gesture image library and the corresponding hand region label library, the first training sample set for constructing the hand detection model is obtained. Each training sample in the first training sample set includes one hand gesture image and a corresponding hand region label image.

At S1212, construct, through the hand region label library corresponding to the hand gesture image library and a hand bone point label library corresponding to the hand region label library, a second training sample set.

In an embodiment of the disclosure, a hand bone point of an image in the hand region label library in step S1211 is marked, to obtain the hand bone point label library corresponding to the hand region label library, and based on the hand region label library and the corresponding hand bone point label library, the second training sample set for constructing the hand bone point marking model is obtained. Each training sample in the second training sample set includes one hand region label image and a corresponding hand bone point label image.

At S1213, train, through the first training sample set, model parameters of a first basic model corresponding to the hand detection model, to obtain the hand detection model.

Particularly, the first basic model may be a neural network model, a support vector machine model, a random forest model, etc., and is not particularly limited herein.

In an embodiment of the disclosure, the first basic model is a neural network model, a hand gesture image in each training sample in the first training sample set is used as input, a hand region label image corresponding to the hand gesture image is used as output, and the parameters of the first basic model are trained, to obtain the hand detection model.

At S1214, train, through the second training sample set, model parameters of a second basic model corresponding to the hand bone point marking model, to obtain the hand bone point marking model.

Particularly, the second basic model may be a neural network model, a support vector machine model, a random forest model, etc., and is not particularly limited herein.

In an embodiment of the disclosure, the second basic model is a neural network model, a hand region label image in each training sample in the second training sample set is used as input, a hand bone point label image corresponding to the hand label image is used as output, and the parameters of the second basic model are trained, to obtain the hand bone point marking model.

At S1215, sequentially connect the hand detection model with the hand bone point marking model, to obtain the recognition model.

In the embodiment, when the first group of hand bone points is recognized from the hand image of the user, the hand image of the user is input into the hand detection model of the recognition model, to obtain a hand region image corresponding to the hand image of the user. Then the obtained hand region image is input into the hand bone point marking model of the recognition model, to obtain the hand bone point image in which the first group of recognized hand bone points is marked on the hand region of the hand image.

In the embodiment, the recognition model may be used to recognize two frames of hand images, acquired by the binocular camera at a first time point, of the user, to obtain two frames of hand bone point images corresponding to the two frames of hand images of the user.

In the embodiment, the recognition model may also be used to recognize ten frames of hand images, acquired by the binocular camera at five continuous time points respectively, of the user, to obtain ten frames of hand bone point images corresponding to the ten frames of hand images of the user.

In another embodiment of the disclosure, the step of constructing the recognition model includes:

At S1221, construct, through step S1211, a first training sample set.

At S1222, input an image in a hand region label library in step S1211 into a binarization processing model to perform binarization processing on the image, to obtain a binarized hand region label library; mark a hand bone point of an image in the binarized hand region label library, to obtain a hand bone point label library corresponding to the binarized hand region label library; and utilize the binarized hand region label library and the corresponding hand bone point label library, to obtain a second training sample set for constructing a hand bone point marking model. Each training sample in the second training sample set includes one binarized hand region label image and a corresponding hand bone point label image, where the corresponding hand bone point label image is a binarized image.

At S1223, obtain, through S1213, a hand detection model.

At S1224, train, through the second training sample set obtained in step S1222, model parameters of a second basic model corresponding to the hand bone point marking model, to obtain the hand bone point marking model.

In an embodiment of the disclosure, the second basic model is a neural network model, the binarized hand region label image in each training sample in the second training sample set is used as input, the hand bone point label image corresponding to the binarized hand label image is used as output, and the parameters of the second basic model are trained, to obtain the hand bone point marking model.

At S1225, sequentially connect the hand detection model with the binarization processing model and the hand bone point marking model, to obtain the recognition model.

In the embodiment, when a first group of hand bone points is recognized from the hand image of the user, the hand image of the user is input into the hand detection model of the recognition model, to obtain a hand region image corresponding to the hand image of the user. Then the hand region image is input into the binarization processing model of the recognition model, to obtain a binarized hand region image. Finally the binarized hand region image is input into the hand bone point marking model of the recognition model, to obtain a hand bone point image in which the first group of recognized hand bone points is marked on the binarized hand region image, where the obtained hand bone point image is a binarized image.

At S1300, obtain, according to the obtained hand bone point image, two-dimensional positional relations and three-dimensional positional relations between various bone points in a second group of hand bone points as hand gesture data of the user, where the first group of hand bone points includes the second group of hand bone points.

Particularly, along with location change of different hand bone points, different gestures are formed. Therefore, when different gestures are recognized, bone points related to gesture formation may be selected from the first group of hand bone points as the second group of bone points, and corresponding gesture recognition is performed based on positional relations between the second group of bone points.

Figure 7:
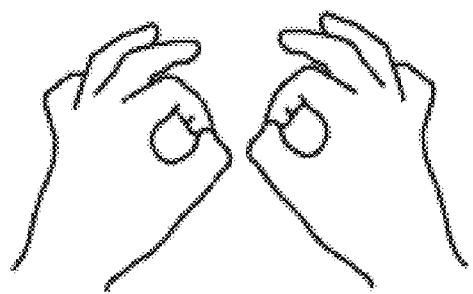
FIG. 7 shows a schematic diagram of a gesture of pinching of a thumb and an index finger according to an embodiment of the disclosure.

In an embodiment of the disclosure, in order to recognize a gesture of pinching of a thumb and an index finger, a second group of selected hand bone points includes a thumb fingertip bone point and an index fingertip bone point, where the schematic diagram of the gesture of pinching of the thumb and the index finger is shown in FIG. 7.

In an embodiment of the disclosure, the obtained hand bone point images are two frames of images, and the two frames of hand bone point images respectively correspond to the two frames of hand images, acquired by the binocular camera at the first time point, of the user. Based on the two frames of hand images, at the first time point, of the user, it is determined whether a gesture, at the first time point, of the user is pinching of the thumb and the index finger.

In the embodiment, the step of obtaining, according to the obtained hand bone point image, two-dimensional positional relations and three-dimensional positional relations between various bone points in a second group of hand bone points includes:

At S1310, obtain, according to two-dimensional coordinates of the thumb fingertip bone point and the index fingertip bone point in the obtained hand bone point image, three-dimensional coordinates of the thumb fingertip bone point and the index fingertip bone point.

Particularly, obtain two-dimensional coordinates of a thumb fingertip bone point and an index fingertip bone point in the two frames of hand bone point images, and separately calculate, based on a binocular ranging principle, three-dimensional coordinates, at the first time point, of a thumb fingertip bone point and an index fingertip bone point. According to the binocular ranging principle, a disparity exists between abscissas, in left and right views, of images of a target point. The disparity is inversely proportional to a distance from the target point to an imaging plane. Based on the inverse proportional relation, the distance from the target point to the imaging plane may be obtained. Three-dimensional coordinates of the target point may be obtained by combining the distance from the target point to the imaging plane with two-dimensional position coordinates of the target point in the image.

At S1320, obtain, according to the three-dimensional coordinates, a three-dimensional Euclidean distance between the thumb fingertip bone point and the index fingertip bone point, and determine, according to the three-dimensional Euclidean distance, a three-dimensional positional relation between the thumb fingertip bone point and the index fingertip bone point.

In the embodiment, a three-dimensional Euclidean distance, at the first time point, between the thumb fingertip bone point and the index fingertip bone point is calculated according to the three-dimensional coordinates, at the first time point, of the thumb fingertip bone point and the index fingertip bone point. Particularly, a calculation method for the three-dimensional Euclidean distance is common knowledge of a person skilled in the art, and is not described in detail herein.

In the embodiment, the three-dimensional positional relation between the thumb fingertip bone point and the index fingertip bone point may be a magnitude relation between the three-dimensional Euclidean distance between the thumb fingertip bone point and the index fingertip bone point and a first set threshold value. The first threshold value is set related to calculation accuracy of the three-dimensional coordinate, and may be set as the calculation accuracy of the three-dimensional coordinate. For example, when the calculation accuracy of the three-dimensional coordinate is 2 mm, the first threshold value may be 2 mm. The first threshold value may be set slightly greater than the calculation accuracy of the three-dimensional coordinate. For example, when the calculation accuracy of the three-dimensional coordinate is 2 mm, the first threshold value may be any value greater than 2 mm and less than or equal to 5 mm.

At S1330, obtain, according to a contour between the thumb fingertip bone point and the index fingertip bone point in the obtained hand bone point image and the two-dimensional coordinates, a two-dimensional Euclidean distance between the thumb fingertip bone point and the index fingertip bone point and a distance of the contour, and determine, according to the two-dimensional Euclidean distance and the distance of the contour, a two-dimensional positional relation between the thumb fingertip bone point and the index fingertip bone point.

Figure 8:
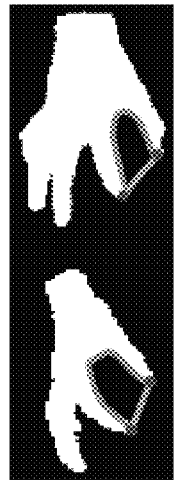
FIG. 8 shows a schematic diagram of a contour between a thumb fingertip bone point and an index fingertip bone point according to an embodiment of the disclosure.

Particularly, how to obtain the two-dimensional coordinates of the target point in the image, how to obtain a contour between two target points, and how to calculate a contour distance and a two-dimensional Euclidean distance between the target points are common knowledge of a person skilled in the art, and are not described in detail herein. For example, the obtained hand bone point image is the binarized hand bone point image. The binarized hand bone point image is subjected to image processing, to extract the thumb fingertip bone point and the index fingertip bone point, and obtain the contour between the thumb fingertip bone point and the index fingertip bone point, as shown in FIG. 8.

In the embodiment, any one of the two frames of obtained hand bone point images may be randomly selected. A contour between a thumb fingertip bone point and an index fingertip bone point in a selected hand bone point image and two-dimensional coordinates of the thumb fingertip bone point and the index fingertip bone point are obtained. A contour distance between the thumb fingertip bone point and the index fingertip bone point in the selected hand bone point image and a two-dimensional Euclidean distance between the thumb fingertip bone point and the index fingertip bone point are calculated. Based on the contour distance and the two-dimensional Euclidean distance between the thumb fingertip bone point and the index fingertip bone point in the selected hand bone point image, a two-dimensional positional relation, at the first time point, between the thumb fingertip bone point and the index fingertip bone point is determined.

In the embodiment, the contour distances between the thumb fingertip bone point and the index fingertip bone point and the two-dimensional Euclidean distances between the thumb fingertip bone point and the index fingertip bone point in the two frames of hand bone point images may be calculated in sequence. The contour distances between the thumb fingertip bone point and the index fingertip bone point in the two frames of hand bone point images are subjected to weighted average, to obtain a contour distance, at the first time point, between the thumb fingertip bone point and the index fingertip bone point. The two-dimensional Euclidean distances between the thumb fingertip bone point and the index fingertip bone point in the two frames of hand bone point images are subjected to weighted average, to obtain a two-dimensional Euclidean distance, at the first time point, between the thumb fingertip bone point and the index fingertip bone point. Based on the contour distance and the two-dimensional Euclidean distance, at the first time point, between the thumb fingertip bone point and the index fingertip bone point in the hand bone point image, a two-dimensional positional relation, at the first time point, between the thumb fingertip bone point and the index fingertip bone point is determined.

In the embodiment, the two-dimensional positional relation between the thumb fingertip bone point and the index fingertip bone point may be a magnitude relation between the contour distance between the thumb fingertip bone point and the index fingertip bone point and the two-dimensional Euclidean distance therebetween.

Further, the two-dimensional positional relation and the three-dimensional positional relation, at the first time point, between the thumb fingertip bone point and the index fingertip bone point are used as hand gesture data, at the first time point, of the user.

In still another embodiment of the disclosure, obtained hand images are ten frames of hand images, acquired by a binocular camera at five continuous time points respectively, of the user. At each time point, two lenses acquire each one frame of hand images of the user from left and right respectively, to obtain two frames of hand images of the user. Based on the ten frames of hand images, acquired at the five continuous time points, of the user, it is determined whether a gesture of the user is pinching of the thumb and the index finger.

In the embodiment, the step of obtaining, according to the obtained hand bone point image, two-dimensional positional relations and three-dimensional positional relations between various bone points in a second group of hand bone points includes:

Obtain, according to steps S1310-S1330, a two-dimensional positional relation and a three-dimensional positional relation, at each time point, between a thumb fingertip bone point and an index fingertip bone point.

In the embodiment, based on the two-dimensional positional relation and the three-dimensional positional relation, at each time point, between the thumb fingertip bone point and the index fingertip bone point, hand gesture data, at each time point, of the user are generated.

At S1400, recognize, according to the hand gesture data, a gesture of the user.

In the embodiment in which the obtained hand bone point images are the two frames of images, the step of recognizing, according to the hand gesture data, a gesture of the user includes:

Determine a gesture recognition result, at the first time point, of the user as pinching of the thumb and the index finger when a two-dimensional positional relation, at the first time point, between the thumb fingertip bone point and the index fingertip bone point is that a contour distance between the thumb fingertip bone point and the index fingertip bone point is greater than a two-dimensional Euclidean distance therebetween, and a three-dimensional positional relation, at the first time point, between the thumb fingertip bone point and the index fingertip bone point is that a three-dimensional Euclidean distance between the thumb fingertip bone point and the index fingertip bone point is smaller than the first set threshold value.

In the embodiment in which the obtained hand bone point images are the plurality of frames of hand images, acquired by each lens at the plurality of set time points respectively, the step of recognizing, according to the hand gesture data, a gesture of the user includes:

Determine a gesture recognition result, at the first time point, of the user as pinching of the thumb and the index finger when a two-dimensional positional relation, at the first time point, between the thumb fingertip bone point and the index fingertip bone point is that a contour distance between the thumb fingertip bone point and the index fingertip bone point is greater than a two-dimensional Euclidean distance therebetween, and a three-dimensional positional relation, at the first time point, between the thumb fingertip bone point and the index fingertip bone point is that a three-dimensional Euclidean distance between the thumb fingertip bone point and the index fingertip bone point is smaller than the first set threshold value.

Traverse the time point.

Determine that the gesture recognition result of the user is pinching of the thumb and the index finger when gesture recognition results, at all time points, of the user are all pinching of the thumb and the index finger after traversing.

Based on the same concept, according to characteristics of different gestures, different bone points may be selected from the first group of hand bone points as a second group of hand bone points. Based on the characteristics of different gestures, different determination methods for the two-dimensional positional relation and the three-dimensional positional relation are selected, thereby finally recognizing other gestures, recognition steps of which are not described in detail herein.

In the embodiment of the disclosure, according to the obtained hand bone point image, the two-dimensional positional relations and the three-dimensional positional relations between various bone points in the second group of hand bone points are obtained as the hand gesture data of the user, so as to recognize the gesture of the user by integrating characteristics of the hand gesture data in two dimensions, thereby greatly improving the accuracy of recognizing the gesture of the user.

Example

Figure 2:
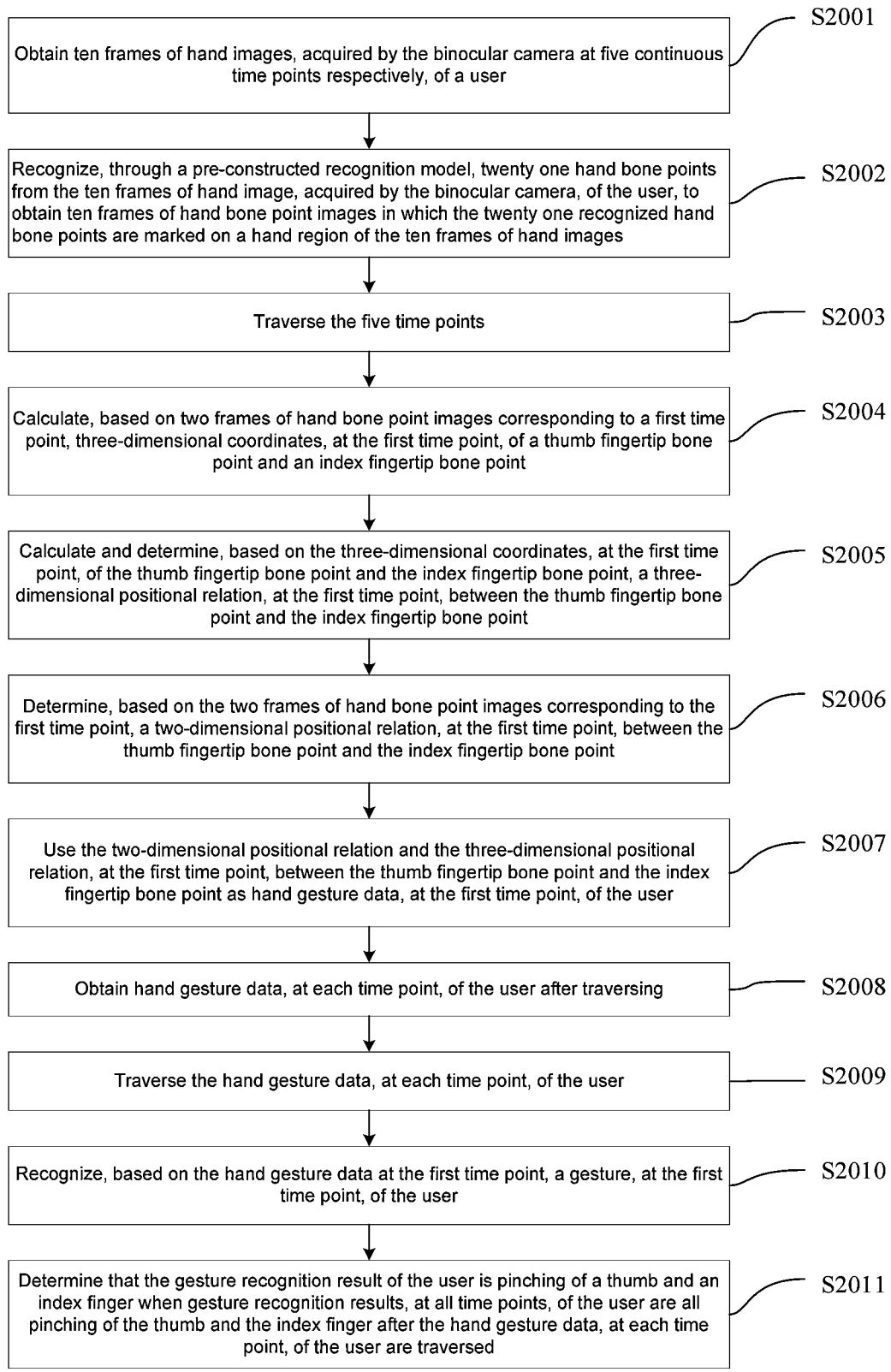
FIG. 2 shows a schematic flow chart of an example of the gesture recognition method for a virtual reality apparatus according to the embodiment of the disclosure.

FIG. 2 is a schematic flow chart of an example of the gesture recognition method for a virtual reality apparatus.

As shown in FIG. 2, in the example, the gesture recognition method may include the following steps:

At S2001, obtain ten frames of hand images, acquired by the binocular camera at five continuous time points respectively, of a user.

Particularly, a time point occurring first of the five continuous times is a first time point.

At S2002, recognize, through a pre-constructed recognition model, twenty one hand bone points from the ten frames of hand image, acquired by the binocular camera, of the user, to obtain ten frames of hand bone point images in which the twenty one recognized hand bone points are marked on a hand region of the ten frames of hand images.

Figure 9:
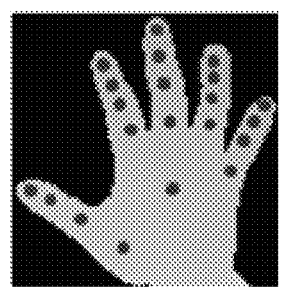
FIG. 9 shows a schematic diagram of a hand bone point image according to an embodiment of the disclosure.

Particularly, the hand bone point image is shown in FIG. 9. The hand bone point image has the total twenty one hand bone points, including twenty finger joint bone joints and one palm center bone joint, the twenty finger joint bone points being positioned on five fingers, each finger being provided with four finger joint bone joints, of which one is arranged on a fingertip, and the other three are respectively arranged on three joints, and one palm center bone joint being positioned at a palm center.

At S2003, traverse the five time points.

At S2004, calculate, based on two frames of hand bone point images corresponding to the first time point, three-dimensional coordinates, at the first time point, of a thumb fingertip bone point and an index fingertip bone point.

Particularly, obtain, two-dimensional coordinates of the thumb fingertip bone point and the index fingertip bone point in the two frames of hand bone point images corresponding to the first time point, and calculate, based on the binocular ranging principle, the three-dimensional coordinates, at the first time point, of the thumb fingertip bone point and the index fingertip bone point.

At S2005, determine, based on the three-dimensional coordinates, at the first time point, of the thumb fingertip bone point and the index fingertip bone point, a three-dimensional positional relation, at the first time point, between the thumb fingertip bone point and the index fingertip bone point.

Particularly, obtain, according to the three-dimensional coordinates, at the first time point, of the thumb fingertip bone point and the index fingertip bone point, a three-dimensional Euclidean distance, at the first time point, between the thumb fingertip bone point and the index fingertip bone point, and determine, according to the three-dimensional Euclidean distance, the three-dimensional positional relation, at the first time point, between the thumb fingertip bone point and the index fingertip bone point.

Particularly, the three-dimensional positional relation between the thumb fingertip bone point and the index fingertip bone point is a magnitude relation between the three-dimensional Euclidean distance between the thumb fingertip bone point and the index fingertip bone point and a first set threshold value, where the first threshold value may be 2 mm.

At S2006, determine, based on the two frames of hand bone point images corresponding to the first time point, a two-dimensional positional relation, at the first time point, between the thumb fingertip bone point and the index fingertip bone point.

Particularly, randomly select any one of the two frames of hand bone point images corresponding to the first time point. Obtain, according to a contour between a thumb fingertip bone point and an index fingertip bone point in the selected hand bone point image and two-dimensional coordinates, a two-dimensional Euclidean distance between the thumb fingertip bone point and the index fingertip bone point and a distance of the contour. Determine, according to the two-dimensional Euclidean distance and the distance of the contour, a two-dimensional positional relation, at the first time point, between the thumb fingertip bone point and the index fingertip bone point.

Particularly, the two-dimensional positional relation between the thumb fingertip bone point and the index fingertip bone point is a magnitude relation between the distance of the contour between the thumb fingertip bone point and the index fingertip bone point and the two-dimensional Euclidean distance therebetween.

At S2007, use the two-dimensional positional relation and the three-dimensional positional relation, at the first time point, between the thumb fingertip bone point and the index fingertip bone point as hand gesture data, at the first time point, of the user.

At S2008, obtain hand gesture data, at each time point, of the user after traversing.

At S2009, traverse the hand gesture data, at each time point, of the user.

At S2010, recognize, based on hand gesture data at the first time point, a gesture, at the first time point, of the user.

Particularly, determine, a gesture recognition result, at the first time point, of the user as pinching of the thumb and the index finger when in the hand gesture data at the first time point, the two-dimensional positional relation between the thumb fingertip bone point and the index fingertip bone point is that the distance of the contour between the thumb fingertip bone point and the index fingertip bone point is greater than the two-dimensional Euclidean distance therebetween, and the three-dimensional positional relation between the thumb fingertip bone point and the index fingertip bone point is that the three-dimensional Euclidean distance between the thumb fingertip bone point and the index fingertip bone point is smaller than 2 mm.

At S2011, determine that the gesture recognition result of the user is pinching of the thumb and the index finger when gesture recognition results, at all time points, of the user are all pinching of the thumb and the index finger after the hand gesture data, at each time point, of the user are traversed.

Method Embodiment 2

Figure 3:
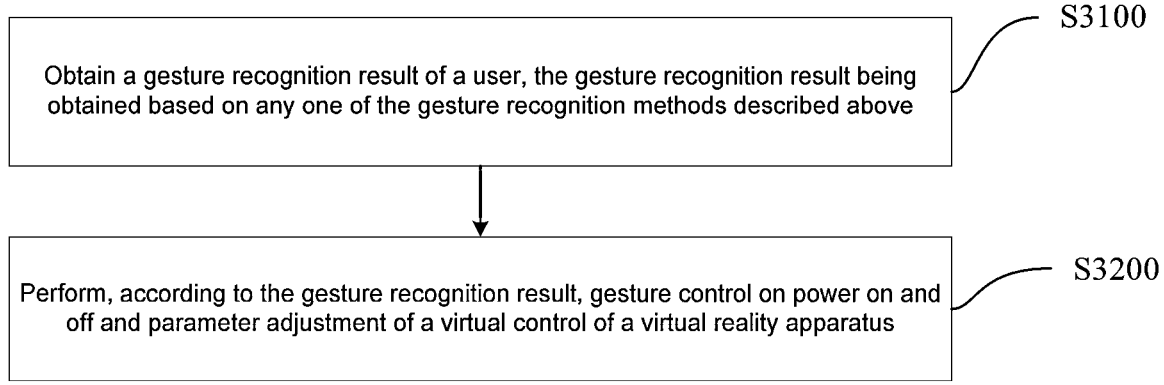
FIG. 3 shows a schematic flow chart of a gesture control method for a virtual reality apparatus according to an embodiment of the disclosure.

FIG. 3 is a schematic flow chart of a gesture control method for a virtual reality apparatus according to an embodiment of the disclosure.

As shown in FIG. 3, the gesture control method includes the following steps:

At S3100, obtain a gesture recognition result of a user, the gesture recognition result being obtained based on any one of the gesture recognition methods described above.

At S3200, perform, according to the gesture recognition result, gesture control on power on and off and parameter adjustment of a virtual control of the virtual reality apparatus.

Particularly, the virtual control of the virtual reality apparatus is of great significance in interaction between the user and a virtual scene. For example, in some virtual content scenes, the virtual control may randomly adjust some functions including display brightness and volume of the scene, visual attributes, etc.

The virtual control may be in any suitable shape, for example, may be circular, elliptical, cylindrical, etc., and is not particularly limited herein. In addition, in a virtual reality system, the virtual control may have any suitable orientation, including a vertical orientation, a horizontal orientation (that is, a rotation axis extends upward/downward), or an inclined orientation, and is not particularly limited herein.

In an embodiment of the disclosure, the virtual control of the virtual reality apparatus is a virtual rotary dial.

Particularly, the study on finger usage habits of users in gesture interaction shows that the thumb and the index finger are the two most habitual and comfortable fingers used by the users in interaction. Therefore, in the embodiment, the virtual rotary dial is controlled through a natural pinching gesture of the thumb and the index finger and a gesture that the thumb is naturally folded and the index finger is naturally unfolded.

In the embodiment, a virtual rotary dial control is controlled mainly in three processes: firstly, trigger the virtual dial to start to rotate through the natural pinching gesture of the thumb and the index finger; secondly, touch-control the virtual dial to rotate through the gesture that the thumb is naturally folded and the index finger is naturally unfolded; and thirdly, end control on the virtual rotary dial through the natural pinching gesture of the thumb and index finger. The above three process events are required for the control on the virtual rotary dial each time.

In the embodiment, when a first gesture recognition result of the user is obtained as pinching of the thumb and the index finger, an instruction to control the virtual rotary dial is sent to the virtual reality system, and then the virtual reality system enables the virtual rotary dial to send out sound perception changes including set music, sound, etc., or enables the virtual rotary dial to change visually in color, size, etc., and the user sees that the virtual rotary dial is successfully turned on through a display screen of a virtual reality head-mounted integrated machine.

In the embodiment, after the virtual rotary dial is successfully turned on, the user slides the index finger in a relatively natural three-dimensional space in a certain direction and motion range through the gesture that the thumb is naturally folded and the index finger is naturally unfolded, to control a rotation angle of the virtual rotary dial, and adjust corresponding parameters thereof through the rotation angle of the virtual rotary dial.

Particularly, when a second gesture recognition result of the user is obtained as that the thumb is naturally folded and the index finger is naturally unfolded, a two-dimensional coordinate variation of index fingertip bone points in at least two frames of hand bone point images is determined through two-dimensional coordinates of the index fingertip bone points in at least two frames of hand bone point images. According to a certain proportional relation, the two-dimensional coordinate variation of the index fingertip bone points in the hand bone point image corresponds to a rotation variation of the virtual rotary dial, so that the index finger moves by a certain range in a three-dimensional space, the virtual rotary dial changes by a certain amount in a virtual space, and the parameters of the virtual rotary dial are adjusted.

In the embodiment, rotation of the virtual rotary dial may also be controlled by other unfolded fingers, which is not limited herein.

In the embodiment, after controlling the virtual rotary dial to rotate to a target value through gesture interaction, the user ends the control on the virtual rotary dial through the gesture of pinching of the thumb and the index finger.

Particularly, when the second gesture recognition result is that the thumb is naturally folded and the index finger is naturally unfolded, and a third gesture recognition result of the user is obtained as that in the case of pinching of the thumb and the index finger, an instruction to end the control on the virtual rotary dial is sent to the virtual reality system, so as to end a control event of the virtual rotary dial.

The virtual rotary dial of the virtual reality apparatus is controlled through the gesture control, so that an interaction method between the user and the virtual reality apparatus is more natural and simpler, thereby greatly improving the user's immersive experience of using the virtual reality apparatus.

Device Embodiment 1

Figure 4:
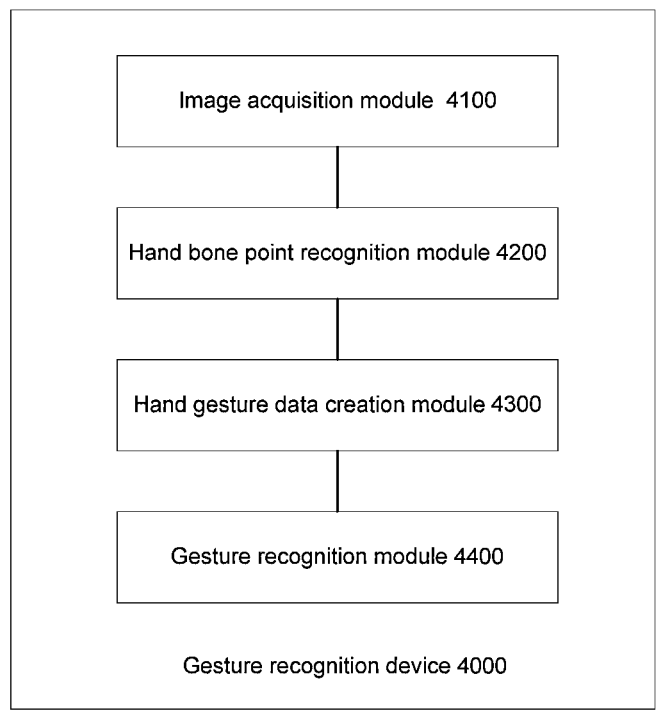
FIG. 4 shows a schematic block diagram of a gesture recognition device for a virtual reality apparatus according to an embodiment of the disclosure.

FIG. 4 is a schematic block diagram of a gesture recognition device for a virtual reality apparatus according to an embodiment of the disclosure. The virtual reality apparatus includes a binocular camera.

As shown in FIG. 4, the gesture recognition device 4000 includes:

an image acquisition module 4100 configured for obtaining a hand image, acquired by each lens of the binocular camera, of a user;

a hand bone point recognition module 4200 configured for recognizing, through a pre-constructed recognition model, a first group of hand bone points from the obtained hand image, to obtain a hand bone point image in which the first group of recognized hand bone points is marked on a hand region of the hand image, where the first group of hand bone points includes finger joint bone points and a palm center bone point;

a hand gesture data creation module 4300 configured for obtaining, according to the obtained hand bone point image, two-dimensional positional relations and three-dimensional positional relations between various bone points in a second group of hand bone points, taking the two-dimensional positional relations and the three-dimensional positional relations as hand gesture data of the user, where the first group of hand bone points includes the second group of hand bone points; and a gesture recognition module 4400 configured for recognizing, according to the hand gesture data, a gesture of the user.

Device Embodiment 2

Figure 5:
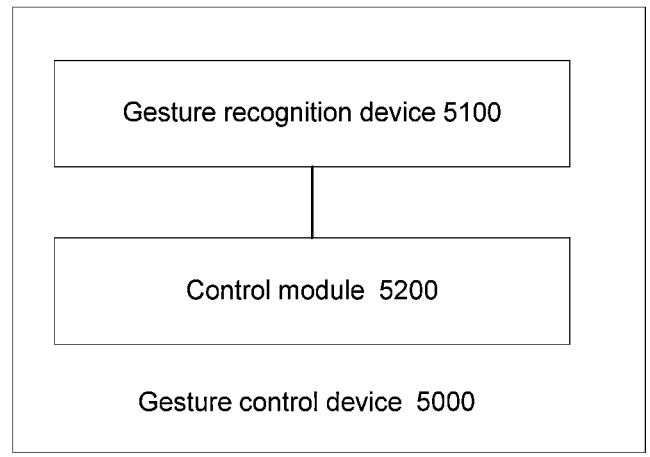
FIG. 5 shows a schematic block diagram of a gesture control device for a virtual reality apparatus according to an embodiment of the disclosure.

FIG. 5 is a schematic block diagram of a gesture control device for a virtual reality apparatus according to an embodiment of the disclosure.

As shown in FIG. 5, the gesture control device 5000 includes:

a gesture recognition device 5100, the gesture recognition device being the gesture recognition device 4000 described above; and a control module 5200 configured for performing, according to a gesture recognition result provided by the gesture recognition device, gesture control on power on and off and parameter adjustment of a virtual control of the virtual reality apparatus.

Apparatus Embodiment

Figure 6:
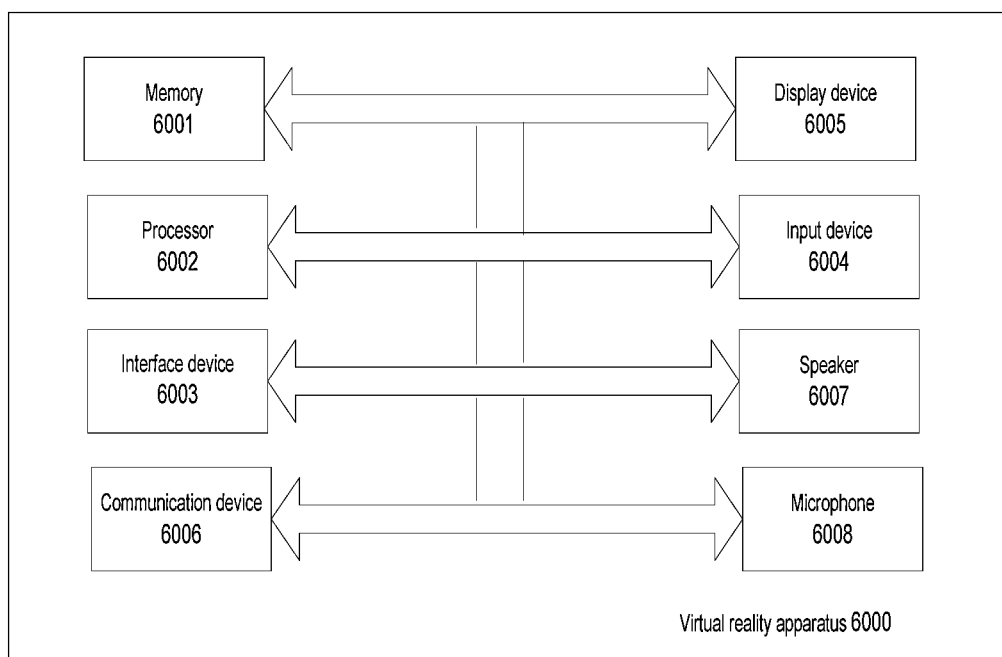
FIG. 6 shows a schematic block diagram of a virtual reality apparatus according to an embodiment of the disclosure.

FIG. 6 shows a schematic block diagram of a virtual reality apparatus according to an embodiment of the disclosure.

As shown in FIG. 6, the virtual reality apparatus 6000 includes a memory 6001 and a processor 6002, the memory 6001 being configured for storing an instruction, and the instruction being used for controlling the processor 6002 to operate any one of the methods described above.

Besides, as shown in FIG. 6, the virtual reality apparatus 6000 further includes an interface device 6003, an input device 6004, a display device 6005, a communication device 6006, a speaker 6007, a microphone 6008, etc. Although a plurality of devices are shown in FIG. 6, the disclosure may relate to only some of them, including, for example, the processor 6002, the memory 6001, the interface device 6003, etc.

The communication device 6006 described above can perform wired or wireless communication, for example.

The interface device 6003 described above includes, for example, an earphone jack, a universal serial bus (USB) interface, etc.

The input device 6004 described above may include, for example, a touch screen, keys, etc.

The display device 6005 described above is, for example, a liquid crystal display, a touch display, etc.

The virtual reality apparatus may be a virtual reality head-mounted integrated machine, a virtual reality headset or a server, where the virtual reality headset is in communication with the server through a communicating device, and particularly, the server is used for executing any one of the methods described above.

Various embodiments described above are mainly described with emphasis on differences from other embodiments, but it will be apparent to those skilled in the art that all the embodiments described above may be used alone or in combination with one another as desired.

The description may be for an apparatus, a method, and/or a computer program product. The computer program product may include a computer-readable storage medium loading computer-readable program instructions for enabling a processor to implement various aspects in the description.

The computer-readable storage medium may be a tangible apparatus that may be used for keeping and storing instructions used by an instruction execution apparatus. The computer-readable storage medium may be but is not limited to an electrical storage apparatus, a magnetic storage apparatus, an optical storage apparatus, an electromagnetic storage apparatus, a semiconductor storage apparatus, or any suitable combination of the foregoing. More specific examples (a non-exhaustive list) of the computer-readable storage medium include: a portable computer disk, a hard disk, a random access memory (RAM), a read only memory (ROM), an erasable programmable read only memory (EPROM or flash memory), a static random access memory (SRAM), a portable compact disk read only memory (CD-ROM), a digital versatile disk (DVD), a memory stick, a floppy disk, a mechanical encoding apparatus, a punched card or protrusion-in-groove structure storing instructions, and any suitable combination of the foregoing. The computer-readable storage medium used herein is not to be construed as a transient signal per se, such as a radio wave or other electromagnetic waves freely propagated, an electromagnetic wave (for example, an optical pulse passing through a fiber optic cable) propagated through a waveguide or other transmission media, or an electrical signal transmitted through an electrical wire.

The computer-readable program instructions described herein may be downloaded from the computer-readable storage medium to various computing/processing apparatuses, or to an external computer or external storage apparatus through a network, such as the internet, a local area network, a wide area network, and/or a wireless network. The network may include a copper transmission cable, fiber optic transmission, wireless transmission, a router, a firewall, a switch, a gateway computer and/or an edge server. A network adapter card or a network interface in each computing/processing apparatus receives the computer-readable program instructions from the network and transmits the computer-readable program instructions, so as to store the computer-readable program instructions in computer-readable storage media in various computing/processing apparatuses.

The computer program instructions for executing operations in the description may be assembly instructions, instruction set architecture (ISA) instructions, machine instructions, machine-related instructions, microcode, firmware instructions, state setting data, or source code or object code written in one language or any combination of more programming languages, where the programming languages include object-oriented programming languages, such as Smalltalk and C++, as well as conventional procedural programming languages such as "C" language or similar programming languages. The computer-readable program instruments may be executed entirely on a user computer, executed partially on the user computer, executed as a stand-alone software package, executed partially on the user computer and partially on a remote computer, or executed entirely on the remote computer or a server. Where the remote computer is involved, the remote computer may be connected to the user computer through any kind of network, including the local area network (LAN) or the wide area network (WAN), or may be connected to the external computer (for example, the remote computer is connected through the internet by an internet service provider). In some embodiments, status information of the computer-readable program instructions is used to custom-make an electronic circuit, such as a programmable logic circuit, a field programmable gate array (FPGA), or a programmable logic array (PLA), where the electronic circuit may execute the computer-readable program instructions, so as to realize all the aspects in the description.

All the aspects in the description are described with reference to the flow charts and/or the block diagrams of the methods, the devices (system) and the computer program product according to the embodiments in the description. It should be understood that each block of the flow charts and/or the block diagrams, and combinations of various blocks of the flow charts and/or the block diagrams, may be implemented through the computer-readable program instructions.

These computer-readable program instructions may be provided for a general-purpose computer, a special-purpose computer, or a processor of another programmable data processing device, to generate a machine, so that these instructions executed by a computer or a processor of another programmable data processing device generate a device for implementing a function/act specified in one or more blocks of the flow charts and/or the block diagrams. The computer-readable program instructions may also be stored in the computer-readable storage medium, to cause the computer, the programmable data processing device, and/or other apparatuses to operate in a specific mode, so that the computer-readable medium storing the instructions includes a manufactured object, including instructions that implement various aspects of a function/act specified in one or more blocks of the flow charts and/or block diagrams.

The computer-readable program instructions may also be loaded onto the computer, other programmable data processing devices, or other apparatuses, so that a series of operations and steps are executed on the computer, other programmable data processing devices, or other apparatuses, to generate a computer-implemented process. Therefore, the instructions executed on the computer, other programmable data processing devices, or other apparatuses implement a function/act specified in one or more blocks of the flow charts and/or the block diagrams.

The flow charts and the block diagrams in the accompanying drawings illustrate system structures, functions and operations, which may be implemented according to the systems, the methods, and the computer program product in multiple embodiments in the description. In this regard, each block of the flow charts or the block diagrams may represent a module, a program segment, or a part of an instruction, which includes one or more executable instructions for implementing specified logical functions. In some alternative implementations, the functions noted in the blocks may also occur in sequences different from those noted in the accompanying drawings. For example, two continuous blocks may be actually executed basically in parallel, or sometimes in reverse sequences, which depends on the involved functions. It should also be noted that each block of the flow charts and/or the block diagrams, and combinations of the blocks of the flow charts and/or the block diagrams, may be implemented by using dedicated hardware-based systems that execute the specified functions or acts, or by using combinations of dedicated hardware and computer instructions. It is well known to those skilled in the art that implementation through hardware, implementation through software, and implementation through a combination of software and hardware are equivalent.

All the embodiments in the description have been described above. The description described above is exemplary, not exhaustive, and is not limited to all the disclosed embodiments. Many modifications and variations will be apparent to those of ordinary skill in the art without departing from the scope and spirit of all the illustrated embodiments. The terms used herein are chosen to best explain the principles and practical applications of all the embodiments, or improvements to the technology in the marketplace, or to enable others of ordinary skill in the art to understand all the embodiments disclosed herein. The scope of the description is defined by the appended claims.

What is claimed is:

1. A gesture recognition method for a virtual reality apparatus, the virtual reality apparatus comprising a binocular camera, and the gesture recognition method comprising:
   obtaining a hand image, acquired by each lens of the binocular camera, of a user;
   recognizing, through a pre-constructed recognition model, two-dimensional coordinates of a first group of hand bone points from the obtained hand image, wherein the first group of hand bone points comprises finger joint bone points and a palm center bone point;
   obtaining, according to the two-dimensional coordinates of the first group of hand bone points, two-dimensional positional relations and three-dimensional positional relations between various bone points in a second group of hand bone points as hand gesture data of the user, wherein the first group of hand bone points comprises the second group of hand bone points, the second group of hand bone points being bone points in the first group of hand bone points related to gesture formation; and
   recognizing a gesture of the user according to the hand gesture data.

2. The method according to claim 1, wherein the second group of hand bone points comprises a thumb fingertip bone point and an index fingertip bone point; and
   the obtaining, according to the two-dimensional coordinates of the first group of hand bone points, two-dimensional positional relations and three-dimensional positional relations between various bone points in a second group of hand bone points comprises:
   obtaining, according to two-dimensional coordinates of the thumb fingertip bone point and the index fingertip bone point, three-dimensional coordinates of the thumb fingertip bone point and the index fingertip bone point;
   obtaining, according to the three-dimensional coordinates, a three-dimensional Euclidean distance between the thumb fingertip bone point and the index fingertip bone point, and determining, according to the three-dimensional Euclidean distance, a three-dimensional positional relation between the thumb fingertip bone point and the index fingertip bone point; and
   obtaining, according to a contour between the thumb fingertip bone point and the index fingertip bone point and the two-dimensional coordinates, a two-dimensional Euclidean distance between the thumb fingertip bone point and the index fingertip bone point and a distance of the contour, and determining, according to the two-dimensional Euclidean distance and the distance of the contour, a two-dimensional positional relation between the thumb fingertip bone point and the index fingertip bone point.

3. The method according to claim 2, further comprising:
   performing weighted average on a contour distance between a thumb fingertip bone point and an index fingertip bone point in two frames of hand bone point images, to obtain a contour distance, at a first time point, between the thumb fingertip bone point and the index fingertip bone point; and performing weighted average on a two-dimensional Euclidean distance between a thumb fingertip bone point and an index fingertip bone point in two frames of hand bone point images, to obtain a two-dimensional Euclidean distance, at a first time point, between the thumb fingertip bone point and the index fingertip bone point.

4. The method according to claim 2, wherein the recognizing, according to the hand gesture data, a gesture of the user comprises:
   determining a gesture recognition result of the user as pinching of a thumb and an index finger when the two-dimensional positional relation is that the distance of the contour is greater than the two-dimensional Euclidean distance and the three-dimensional positional relation is that the three-dimensional Euclidean distance is smaller than a set threshold value.

5. The method according to claim 4, wherein the obtaining a hand image, acquired by each lens of the binocular camera, of a user comprises:
   obtaining a plurality of frames of hand images acquired by each lens at a plurality of set time points respectively;
   the obtaining, according to the two-dimensional coordinates of the first group of hand bone points, two-dimensional positional relations and three-dimensional positional relations between various bone points in a second group of hand bone points comprises:
   obtaining, according to the hand bone point image obtained at the same time point, two-dimensional positional relations and three-dimensional positional relations, corresponding to the time point, between various bone points in the second group of hand bone points; and
   recognizing a gesture of the user according to the hand gesture data comprises:
   determining a gesture recognition result, at the time point, of the user as pinching of a thumb and an index finger when the two-dimensional positional relation corresponding to the time point is that a distance of the contour is greater than the two-dimensional Euclidean distance, and the three-dimensional positional relation is that the three-dimensional Euclidean distance is smaller than a set threshold value;
   traversing the time point; and
   determining that the gesture recognition result of the user is pinching of the thumb and the index finger when gesture recognition results, at all time points, of the user are all pinching of the thumb and the index finger after traversing.

6. The method according to claim 1, wherein the first group of hand bone points comprises the twenty finger joint bone points and the one palm center bone point,
   each finger being provided with four of the finger joint bone points, of which one is arranged on a fingertip, and the other three are respectively arranged on 3 joints of a corresponding finger.

7. The method according to claim 1, wherein the recognition models comprise a hand detection model and a hand bone point marking model, the hand detection model being used for recognizing the hand region from the hand image, and the hand bone point marking model being used for recognizing and marking the first group of hand bone points in the hand region; and
   the step of constructing the recognition model comprises:
   constructing, through a hand gesture image library and a hand region label library corresponding to the hand gesture image library, a first training sample set;

constructing, through the hand region label library corresponding to the hand gesture image library and a hand bone point label library corresponding to the hand region label library, a second training sample set;

training, through the first training sample set, model parameters of a first basic model corresponding to the hand detection model, to obtain the hand detection model;

training, through the second training sample set, model parameters of a second basic model corresponding to the hand bone point marking model, to obtain the hand bone point marking model; and sequentially connecting the hand detection model with the hand bone point marking model, to obtain the recognition model.

8. A gesture control method for a virtual reality apparatus, the gesture control method comprising:

obtaining a gesture recognition result of a user, the gesture recognition result being obtained based on the gesture recognition method as claimed in claim 1; and performing, according to the gesture recognition result, gesture control on power on and off and parameter adjustment of a virtual control of the virtual reality apparatus.

9. A gesture recognition device for a virtual reality apparatus, the virtual reality apparatus comprising a binocular camera, and the gesture recognition device comprising:

an image acquisition module, configured to obtain a hand image, acquired by each lens of the binocular camera, of a user;

a hand bone point recognition module, configured to recognize, through a pre-constructed recognition model, two-dimensional coordinates of a first group of hand bone points from the obtained hand image, wherein the first group of hand bone points comprises finger joint bone points and a palm center bone point;

a hand gesture data creation module, configured to obtain, according to the two-dimensional coordinates of the first group of hand bone points, two-dimensional positional relations and three-dimensional positional relations between various bone points in a second group of hand bone points, and taking the two-dimensional positional relations and the three-dimensional positional relations as hand gesture data of the user, wherein the first group of hand bone points comprises the second group of hand bone points, the second group of hand bone points being bone points in the first group of hand bone points related to gesture formation; and a gesture recognition module, configured to recognize a gesture of the user according to the hand gesture data.

10. A gesture control device for a virtual reality apparatus, comprising:

the gesture recognition device as claimed in claim 9; and a control module, configured to perform, according to a gesture recognition result provided by the gesture recognition device, gesture control on power on and off and parameter adjustment of a virtual control of the virtual reality apparatus.

11. A virtual reality apparatus, comprising a processor and a memory, an instruction is stored in the memory, and the processor is configured to execute the instruction to:

obtain a hand image, acquired by each lens of a binocular camera, of a user;

recognize, through a pre-constructed recognition model, two-dimensional coordinates of a first group of hand bone points from the obtained hand image, wherein the first group of hand bone points comprises finger joint bone points and a palm center bone point;

obtain, according to the two-dimensional coordinates of the first group of hand bone points, two-dimensional positional relations and three-dimensional positional relations between various bone points in a second group of hand bone points as hand gesture data of the user, wherein the first group of hand bone points comprises the second group of hand bone points, the second group of hand bone points being bone points in the first group of hand bone points related to gesture formation; and recognize a gesture of the user according to the hand gesture data.

12. The apparatus according to claim 11, wherein the second group of hand bone points comprises a thumb fingertip bone point and an index fingertip bone point, and the processor is further configured to:

obtain, according to two-dimensional coordinates of the thumb fingertip bone point and the index fingertip bone point, three-dimensional coordinates of the thumb fingertip bone point and the index fingertip bone point;

obtain, according to the three-dimensional coordinates, a three-dimensional Euclidean distance between the thumb fingertip bone point and the index fingertip bone point, and determining, according to the three-dimensional Euclidean distance, a three-dimensional positional relation between the thumb fingertip bone point and the index fingertip bone point; and obtain, according to a contour between the thumb fingertip bone point and the index fingertip bone point and the two-dimensional coordinates, a two-dimensional Euclidean distance between the thumb fingertip bone point and the index fingertip bone point and a distance of the contour, and determining, according to the two-dimensional Euclidean distance and the distance of the contour, a two-dimensional positional relation between the thumb fingertip bone point and the index fingertip bone point.

13. The apparatus according to claim 12, the processor is further configured to:

perform weighted average on a contour distance between a thumb fingertip bone point and an index fingertip bone point in two frames of hand bone point images, to obtain a contour distance, at a first time point, between the thumb fingertip bone point and the index fingertip bone point; and perform weighted average on a two-dimensional Euclidean distance between a thumb fingertip bone point and an index fingertip bone point in two frames of hand bone point images, to obtain a two-dimensional Euclidean distance, at a first time point, between the thumb fingertip bone point and the index fingertip bone point.

14. The apparatus according to claim 12, the processor is further configured to:

determine a gesture recognition result of the user as pinching of a thumb and an index finger when the two-dimensional positional relation is that the distance of the contour is greater than the two-dimensional Euclidean distance and the three-dimensional positional relation is that the three-dimensional Euclidean distance is smaller than a set threshold value.

15. The apparatus according to claim 14, the processor is further configured to:

obtain a plurality of frames of hand images acquired by each lens at a plurality of set time points respectively;

obtain, according to the hand bone point image obtained at the same time point, two-dimensional positional relations and three-dimensional positional relations, corresponding to the time point, between various bone points in the second group of hand bone points; and determine a gesture recognition result, at the time point, of the user as pinching of a thumb and an index finger when the two-dimensional positional relation corresponding to the time point is that a distance of the contour is greater than the two-dimensional Euclidean distance, and the three-dimensional positional relation is that the three-dimensional Euclidean distance is smaller than a set threshold value;

traverse the time point;

determine that the gesture recognition result of the user is pinching of the thumb and the index finger when gesture recognition results, at all time points, of the user are all pinching of the thumb and the index finger after traversing.

16. The apparatus according to claim 11, wherein the first group of hand bone points comprises twenty finger joint bone points and one palm center bone point, each finger being provided with four of the finger joint bone points, of which one is arranged on a fingertip, and the other three are respectively arranged on 3 joints of a corresponding finger.

17. The method according to claim 8, wherein the second group of hand bone points comprises a thumb fingertip bone point and an index fingertip bone point; and obtaining, according to the two-dimensional coordinates of the first group of hand bone points, two-dimensional positional relations and three-dimensional positional relations between various bone points in a second group of hand bone points comprises:

obtaining, according to two-dimensional coordinates of the thumb fingertip bone point and the index fingertip bone point, three-dimensional coordinates of the thumb fingertip bone point and the index fingertip bone point;

obtaining, according to the three-dimensional coordinates, a three-dimensional Euclidean distance between the thumb fingertip bone point and the index fingertip bone point, and determining, according to the three-dimensional Euclidean distance, a three-dimensional positional relation between the thumb fingertip bone point and the index fingertip bone point; and obtaining, according to a contour between the thumb fingertip bone point and the index fingertip bone point and the two-dimensional coordinates, a two-dimensional Euclidean distance between the thumb fingertip bone point and the index fingertip bone point and a distance of the contour, and determining, according to the two-dimensional Euclidean distance and the distance of the contour, a two-dimensional positional relation between the thumb fingertip bone point and the index fingertip bone point.

18. The method according to claim 17, further comprising:

performing weighted average on a contour distance between a thumb fingertip bone point and an index fingertip bone point in two frames of hand bone point images, to obtain a contour distance, at a first time point, between the thumb fingertip bone point and the index fingertip bone point; and performing weighted average on a two-dimensional Euclidean distance between a thumb fingertip bone point and an index fingertip bone point in two frames of hand bone point images, to obtain a two-dimensional Euclidean distance, at a first time point, between the thumb fingertip bone point and the index fingertip bone point.

19. The method according to claim 17, wherein the recognizing, according to the hand gesture data, a gesture of the user comprises:

determining a gesture recognition result of the user as pinching of a thumb and an index finger when the two-dimensional positional relation is that the distance of the contour is greater than the two-dimensional Euclidean distance and the three-dimensional positional relation is that the three-dimensional Euclidean distance is smaller than a set threshold value.

20. The method according to claim 19, wherein the obtaining a hand image, acquired by each lens of the binocular camera, of a user comprises:

obtaining a plurality of frames of hand images acquired by each lens at a plurality of set time points respectively;

obtaining, according the two-dimensional coordinates of the first group of hand bone points, two-dimensional positional relations and three-dimensional positional relations between various bone points in a second group of hand bone points comprises:

obtaining, according to the hand bone point image obtained at the same time point, two-dimensional positional relations and three-dimensional positional relations, corresponding to the time point, between various bone points in the second group of hand bone points; and recognizing a gesture of the user according to the hand gesture data comprises:

determining a gesture recognition result, at the time point, of the user as pinching of a thumb and an index finger when the two-dimensional positional relation corresponding to the time point is that a distance of the contour is greater than the two-dimensional Euclidean distance, and the three-dimensional positional relation is that the three-dimensional Euclidean distance is smaller than a set threshold value;

traversing the time point; and determining that the gesture recognition result of the user is pinching of the thumb and the index finger when gesture recognition results, at all time points, of the user are all pinching of the thumb and the index finger after traversing.

* * * * *